Sept. 12, 1967　　　　D. C. JOHNSON　　　　3,341,244
AUTOMATICALLY RELEASABLE CABLE HOOK
Filed Dec. 1, 1965　　　　　　　　　　　　2 Sheets-Sheet 2
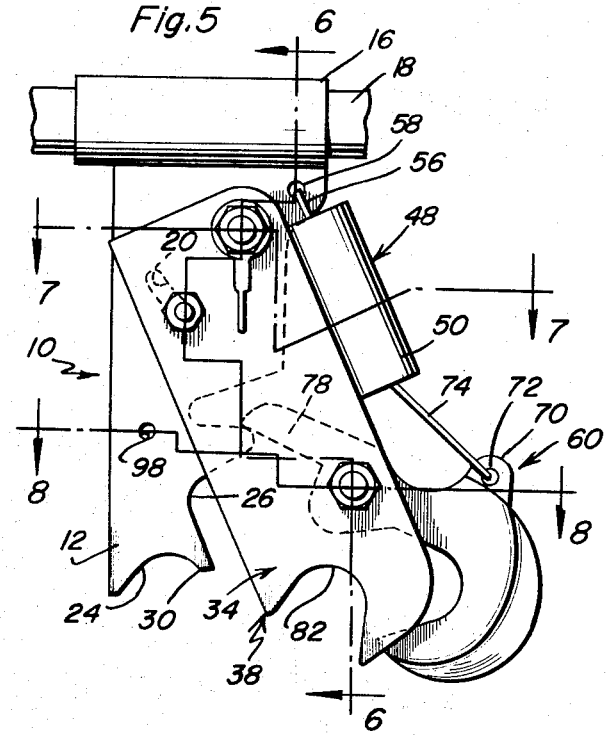
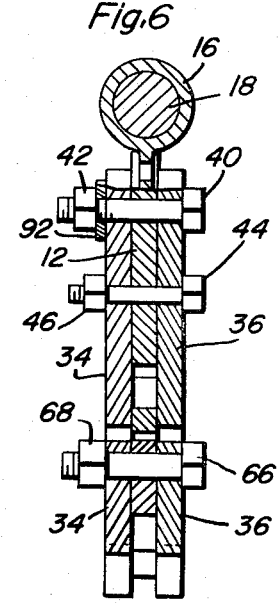
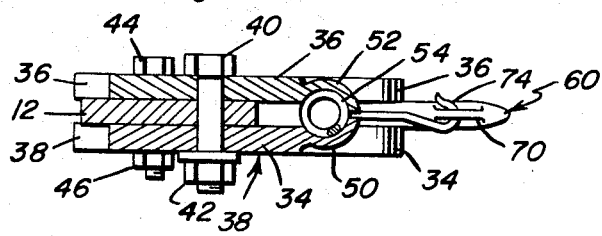
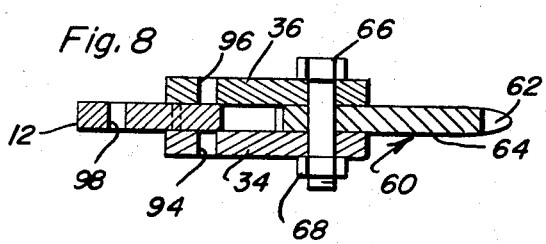
Downing C. Johnson
INVENTOR.

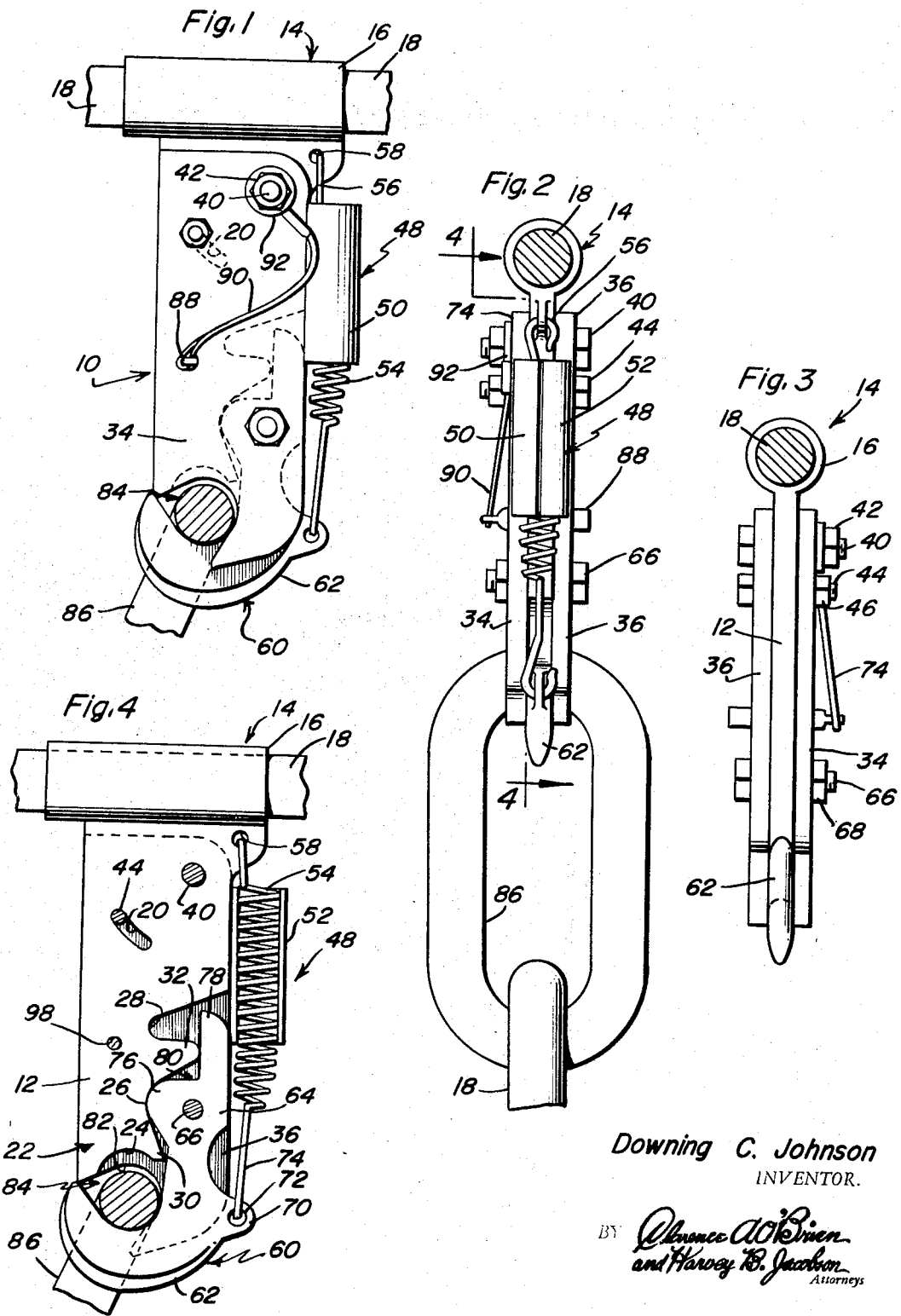

United States Patent Office 3,341,244
Patented Sept. 12, 1967

3,341,244
AUTOMATICALLY RELEASABLE CABLE HOOK
Downing C. Johnson, P.O. Box 144,
Valley Head, Ala. 35989
Filed Dec. 1, 1965, Ser. No. 510,882
7 Claims. (Cl. 294—75)

This invention relates generally to cable hooks, and more particularly to cable hooks useful in forming loops in cables for use in logging operations or in other operations where it is desired to pull, lift or drag objects by cable.

Briefly, this invention comprises an automatically releasable cable hook which can be retained on a cable to form a loop thereon when tension is applied to the cable. The cable hook is automatically released from the cable portion on which it is retained in order to allow the loop formed with the cable hook to be released when the tension or force on the cable is relieved. Thus, the cable hook of the present invention provides means for automatic release thereof without the necessity of manual disengagement after the operation necessitating use of a cable loop is completed.

It is an object of the present invention to provide an automatically releasable hook for use with cables to form loops therein.

It is another object of the present invention to provide a cable hook for forming cable loops, the hook including means providing for the automatic release of the cable hook in order to allow disengagement of the loop when tension upon the cable is relieved.

A further object of the present invention is to provide a novel cable hook of relatively simple construction which is at the same time quite sturdy, compact and effective in use.

It is a further object of the present invention to provide a cable loop forming hook which is mounted on a cable at one end, and includes latch means at the other end thereof for releasably engaging a portion of a cable to form a loop therein, the latch means being responsive to tension on the cable for remaining latched and responsive to release of tension in the cable for automatically releasing the cable at which time the loop formed in the cable will be released.

It is a further object of the present invention to provide an automatically releasable cable hook which comprises a minimum of moving parts and which includes means for retaining the hook in closed or latched position on a cable irrespective of the tension applied to the cable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of the automatically releasable cable hook comprising the present invention;

FIGURE 2 is a side elevational view of the cable hook illustrated in FIGURE 1 taken from the right side of FIGURE 1;

FIGURE 3 is a side elevational view of the hook illustrated in FIGURE 1 taken from the left side of FIGURE 1;

FIGURE 4 is a vertical sectional view taken substantially on the plane of the line 4—4 of FIGURE 2;

FIGURE 5 is an elevational view similar to that of FIGURE 1 illustrating the automatically releasable cable hook in unlatched or released condition;

FIGURE 6 is a vertical sectional view taken substantially on the plane of the line 6—6 of FIGURE 5;

FIGURE 7 is a horizontal sectional view taken substantially on the plane of the line 7—7 of FIGURE 5; and FIGURE 8 is a horizontial sectional view taken substantially on the plane of the line 8—8 of FIGURE 5.

Referring now more particularly to the drawings, reference numeral 10 generally denotes the automatically releasable cable hook of the present invention. The cable hook 10 includes a shank 12 which has the cable receiving reeveway member or cable eye 14 integrally formed at the upper end thereof, the shank and reeveway member being fabricated of a suitable metallic material. The reeveway member 14 comprises an elongate cylindrical member 16 through which a cable 18 may be reeved.

The shank 12 has an arcuate slot 20 therein for a purpose to be described more fully below and a bottom portion generally denoted by reference numeral 22 which includes adjacent recesses 24, 26 and 28 which define shoulders 30 and 32 therebetween.

A pair of ejector plates 34 and 36 comprising the ejector housing 38 are rotatably mounted on the upper portion of shank 12 by bolt 40, the bolt 40 having a nut 42 threadedly received on the end thereof. The bolt 40 extends through the ejector plates 34 and 36 as well as through the shank 12. A second bolt 44 including the nut 46 threaded on the end thereof extends through the ejector plates 34 and 36 in order to further join them to complete the housing 38, and also through the arcuate slot 20 whereby it will be appreciated from viewing FIGURES 1 and 5 in particular that the rotation of the housing 38 about the bolt 40 will be limited by the length of arcuate slot 20. A spring housing 48 comprising arcuate half-housing members 50 and 52 mounted on the back edges of ejector plates 34 and 36, respectively, is provided to shield and retain a coil spring 54 therein. The upper end of spring 54 has an upstanding leg 56 thereon which is releasably hooked in an aperture 58 in shank 12.

A latch member generally denoted by reference numeral 60 and comprising the hook portion 62 and upstanding leg portion 64 is rotatably mounted between the ejector plates 34 and 36 on the bolt 66 which extends through the plates 34 and 36 and the leg portion 64 of latch 60, and is retained therein by the nut 68. The hook portion 62 of latch 60 includes an outstanding ear 70 on the rear side thereof, the ear having an aperture 72 therein in which a lower leg 74 of spring 54 is releasably hooked. The leg portion 64 includes a forwardly projecting shoulder 76 and an upstanding ear 78 forming a right angled recess 80 therebetween.

The ejector plates 34 and 36 each includes a recess 82 in the lower edge thereof, the recesses 82 forming, in conjunction with the recess 44 of shank 12, and the hook 62, a reeveway 84 through which a fastening ring 86 may be received. The fastening ring 86 has the end of cable 18 fixedly mounted thereon and thus, when the fastening ring 86 is received in the hook as illustrated in FIGURES 1 and 4 for example the cable 18 forms a loop which may be releasably fastened around an object such as a log or the like for pulling, dragging or lifting thereof.

Referring now to FIGURES 1, 4 and 5 for a description of the operation of the automatic releasable cable hook 10, it will be observed that the spring 54 normally causes the cable hook 10 to be retained in the position illustrated in FIGURE 5. Thus, the spring 54 which is mounted between the aperture 58 in shank 12 and the aperture 72 in hook ear 70 causes the latch 60 and the ejector housing 38 to rotate about bolt 40 to the position limited by the end of slot 20, and the latch 60 to be further rotated in the housing 38 until the end of ear 78 strikes the shoulder 32 in shank 12, thereby limiting the upward rotation of the latch 60. This position is illustrated in FIGURE 5 and of course, it will be appreciated that at this time the cable 18 does not have a loop formed therein.

In order to form a loop in the cable, the fastening ring 86 is moved into the recesses 82 in the ejector plates 34 and 36, and the latch member 60 and ejector housing 38 is manually snapped closed to the position illustrated in FIGURES 1 and 4 by overcoming the force of spring 54, at which time the reeveway 84 will be formed between the recesses 82 and the hook 62. At this time a state of disequilibrium exists due to the force of spring 54 and hook 62 and housing 38 will swing open to the position illustrated in FIGURE 5 if not retained closed. Thus, a retaining pin 88 which is connected to the ejector housing 38 by a flexible retaining member 90 which is attached to the pin 88 at one end and to a washer member 92 at the other end may be moved through the apertures 94 and 96 in the plates 34 and 36 respectively and through the aperture 98 in shank 12 in order to retain the latch 60 and housing 38 in closed or reeveway forming position. The washer member 92 is mounted on the bolt 40 and retained thereon by the nut 42. When the pin 88 is so positioned, it will be appreciated that the latch 60 will be retained in the closed or latched position and a state of static balance will be achieved and thus the loop formed in the cable 18 will be retained around the object contained therein until such time as the pin 88 is removed in order to permit the latch 60 to be opened automatically by the spring 54.

There is another manner of retaining the latch 60 and ejector housing 38 in closed position and thus retain the loop formed in the cable 18 about the object. Thus, it will be appreciated that if the retaining pin 88 is not positioned in the apertures 94, 96 and 98, but, on the other hand, tension is maintained on the portion of the cable 18 which extends outwardly of the reeveway member 14, downward force will be exerted against the upper portion of the hook 62 by the fastening ring 86, this downward force against the hook 62 overcoming the upward force on the hook by the spring 54 and thus retaining the latch in a state of static balance or in closed position. The tension is, of course, applied to the cable 18 after the loop is formed in the cable by the automatically releasable cable hook 10 when the cable is looped around an object such as a log, and the log is being dragged or lifted by a device such as a cable wrench or the like. The tension or pull applied to the cable 18 by the winch will cause downward pull on the hook 62 inasmuch as the cable is looped about an object and effectively received in the hook 62 by ring 86 and the force is applied upwardly on the cylindrical member 16 and downwardly on hook 62. The automatic release operation of the cable hook 10 is achieved when the tension is relieved on the cable 18, as for example when a log which is being pulled by the cable has reached its final destination and the cable winch or the like is stopped, at which time the downward force on hook 62 will be relieved and a state of disequilibrium will again be effected by the bias force of spring 54, thereby allowing the spring 54 to rotate the latch 60 and ejector housing 38 to the position illustrated in FIGURE 5. At this time the ejector plates 34 and 36 will automatically push the fastening ring 86 out of the hook 62 as the hook 62 rotates rearwardly between the plates 34 and 36. Thus, it will be appreciated that this invention comprises means for forming a loop in a cable and either retaining the cable in looped condition by a state of static balance being achieved and maintained by the pin 88 or tension force applied to the cable 18, the cable loop being automatically released when the pin is removed or such tension is relieved due to the disequilibrium on the latch and ejector housing by spring 54.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cable hook for forming cable loops comprising, a shank member, means on the upper portion of said shank member for receiving a cable, means rotatably mounted relative to said shank member for forming a releasable hook in conjunction with the bottom end of said shank member, said releasable hook adapted to receive the end of the cable therein whereby a loop will be formed in said cable, means for rotatably biasing said hook forming means to an open or released position, means for overcoming the bias force of said biasing means whereby a static balance will be maintained on said hook forming means for retaining said hook forming means in closed or hook-forming position, and means for ejecting the cable end from said hook forming means when said overcoming means is relieved and said bias means operates to open said hook forming means, said ejecting means comprising, an ejector housing, one end of said housing mounted at the upper end of said shank member for rotation with respect thereto, said hook forming means comprising, a latch member rotatably mounted at the other end of said ejector housing, said shank member having a downwardly opening recess at the bottom end thereof, said latch member and said recess forming a reeveway for the cable when said overcoming means operates to maintain said hook forming means in static balance.

2. The combination of claim 1 wherein said biasing means is connected between said shank member and said latch member, said overcoming means comprising a pin adapted to releasably engage said shank member and said ejector housing whereby rotation of said ejector housing and said latch member will be prevented.

3. The combination of claim 1 wherein said biasing means is connected between said shank member and said latch member, said latch member having a cable receiving portion therein for receiving the cable end, the tension applied to said cable during use thereof being transmitted to said latch member by said cable receiving portion for overcoming the rotational biasing force of said biasing means thus retaining said latch means and said ejector housing in non-rotatable condition when tension is applied to said cable, and the rotational biasing force of said biasing means causing said latch member and said ejector housing to rotate when the tension on said cable is relieved.

4. The combination of claim 1 wherein said biasing means is connected between said shank member and said latch member for a rotational biasing of both the latch member and the ejector housing, means for limiting the biased rotational movement of said ejector housing relative to said shank member, and separate means limiting the biased rotational movement of said latch member relative to said ejector housing and said shank member.

5. The combination of claim 4 wherein said ejector housing comprises a pair of parallel ejector plates, one located to each side of said shank member, said latch member being located between said ejector plates generally coplanar with said shank member.

6. The combination of claim 5 wherein each of said ejector plates has a cable receiving recess therein opening away from the direction of bias induced movement.

7. A cable hook comprising a shank member, means on the upper portion of said shank member for mounting said shank member, means rotatably mounted relative to said shank member for forming a releasable hook in conjunction with a portion of said shank member below said upper portion, means for rotatably biasing said hook forming means to an open or released position relative to said shank member, means for overcoming the bias force of said biasing means whereby a static balance will be maintained on said hook forming means for retaining said hook forming means in closed or hook-forming position, and ejection means for ejecting a received member from said hook forming means when said overcoming means is relieved and said bias means operates to open said hook forming means, said ejection means comprising an ejector member, one end of said ejector member being mounted at the upper portion of said shank member for rotation with respect thereto, said hook forming means comprising a latch member rotatably mounted at the other end of said ejector member, said shank member and said latch member forming a reeveway for a cable or the like when said overcoming means operates to maintain said hook forming means in static balance.

References Cited

UNITED STATES PATENTS 3,145,042  8/1964  Bendl _____ 294—83

FOREIGN PATENTS 588,176  1/1959  Italy.

GERALD M. FORLENZA, *Primary Examiner.*

G. F. ABRAHAM, *Assistant Examiner.*